United States Patent
Kumara et al.

(10) Patent No.: US 11,110,924 B2
(45) Date of Patent: Sep. 7, 2021

(54) METHOD AND APPARATUS FOR DYNAMIC ADJUSTMENT OF VEHICLE MOTION PROFILES

(71) Applicant: GM GLOBAL TECHNOLOGY OPERATIONS LLC, Detroit, MI (US)

(72) Inventors: Namal P. Kumara, Ypsilanti, MI (US); Paul A. Adam, Milford, MI (US)

(*) Notice: Subject to any disclaimer, the term of this patent is extended or adjusted under 35 U.S.C. 154(b) by 179 days.

(21) Appl. No.: 16/450,040

(22) Filed: Jun. 24, 2019

(65) Prior Publication Data

US 2020/0398837 A1 Dec. 24, 2020

(51) Int. Cl.
*B60W 30/165* (2020.01)
*B60W 40/107* (2012.01)
*B60W 30/17* (2020.01)

(52) U.S. Cl.
CPC .......... *B60W 30/165* (2013.01); *B60W 30/17* (2013.01); *B60W 40/107* (2013.01)

(58) Field of Classification Search
CPC ....... G01C 21/00; G01C 21/12; B60W 10/20; B60W 2550/30; B60W 2550/302; B60W 2550/304; B60W 2550/306; B60W 2550/308; B60W 30/08; B60W 30/09; B60W 30/10; B60W 30/12; B60W 30/14; B60W 30/143; B60W 30/16; B60W 30/165; B60W 30/17; B60W 40/107; B60K 2310/00; B60K 2310/24; B60K 2310/242; B60K 2310/244; B60K 2310/248; B60K 2310/26; B60K 2310/262; B60K 2310/264; B60K 2310/266; B60K 2310/28
USPC .......................................................... 701/96
See application file for complete search history.

(56) References Cited

U.S. PATENT DOCUMENTS

| | | | |
|---|---|---|---|
| 7,363,140 B2* | 4/2008 | Ewerhart | B60W 30/16 701/96 |
| 2004/0193374 A1* | 9/2004 | Hac | G08G 1/167 701/301 |
| 2016/0176402 A1* | 6/2016 | Andersson | B60W 30/16 701/96 |

* cited by examiner

*Primary Examiner* — Anthony R Jimenez

(57) ABSTRACT

An apparatus including a sensor for detecting a first acceleration of a target vehicle at a first time and a second acceleration of the target vehicle at a second time, a processor operative to calculate an increased distance in response to the first acceleration and the second acceleration exceeding an acceleration threshold, the processor further operative to generate a control signal indicative of the increased distance, and a vehicle controller for controlling a vehicle throttle controller and a vehicle steering controller to maintain an initial distance between the host vehicle and the target vehicle and to maintain the increased distance between the host vehicle and the target vehicle in response to the control signal.

20 Claims, 5 Drawing Sheets

METHOD AND APPARATUS FOR DYNAMIC ADJUSTMENT OF VEHICLE MOTION PROFILES

BACKGROUND

The present disclosure relates generally to programming motor vehicle control systems. More specifically, aspects of this disclosure relate to systems, methods and devices for providing historical profiles for target object behaviors to adjust braking and lateral offset profiles to deliver smooth vehicle dynamics in an ADAS equipped vehicle.

The operation of modern vehicles is becoming more automated, i.e. able to provide driving control with less and less driver intervention. Vehicle automation has been categorized into numerical levels ranging from zero, corresponding to no automation with full human control, to five, corresponding to full automation with no human control. Various advanced driver-assistance systems (ADAS), such as cruise control, adaptive cruise control, and parking assistance systems correspond to lower automation levels, while true "driverless" vehicles correspond to higher automation levels.

Adaptive cruise control systems have been developed where not only does the system maintain the set speed, but also will automatically slow the vehicle down in the event that a slower moving preceding vehicle is detected using various sensors, such as radar and cameras. Further, some vehicle systems attempt to maintain the vehicle near the center of a lane on the road. However, in situations where other vehicles in close proximity to the host vehicle behave in erratic fashion, the response from the host vehicle may produce abrupt reactions affecting customer comfort and satisfaction. It would be desirable to overcome these problems to provide a method and apparatus for dynamic adjustment of vehicle motion profiles in an ADAS equipped motor vehicle.

The above information disclosed in this background section is only for enhancement of understanding of the background of the invention and therefore it may contain information that does not form the prior art that is already known in this country to a person of ordinary skill in the art.

SUMMARY

Disclosed herein are autonomous vehicle control system training systems and related control logic for provisioning autonomous vehicle control, methods for making and methods for operating such systems, and motor vehicles equipped with onboard control systems. By way of example, and not limitation, there is presented an automobile with onboard vehicle control learning and control systems.

In accordance with an aspect of the present invention, an apparatus including a sensor operative to detect a first distance between a host vehicle and a target vehicle at a first time, a second distance between the host vehicle and the target vehicle at a second time, and a third distance between the host vehicle and the target vehicle at a third time, a user input operative to receive a user selection of a selected offset distance, a processor operative to determine a first acceleration of the target vehicle in response to the first distance and the second distance, an a second acceleration of the target vehicle in response to the second distance and the third distance, the processor further operative to calculate an calculated offset distance in response to the first acceleration and the second acceleration exceeding a threshold acceleration value and for generating a control signal in response to the calculated offset distance being greater than the selected offset distance, and a vehicle controller operative to maintain the calculated offset distance between the host vehicle and the target vehicle in response to the control signal.

In accordance with another aspect of the present invention wherein the selected offset distance is a following distance between the host vehicle and the target vehicle in a vehicle lane.

In accordance with another aspect of the present invention wherein the selected offset distance is a lateral offset distance between the host vehicle in a first road lane and the target vehicle in an adjacent road lane.

In accordance with another aspect of the present invention wherein the vehicle controller is operative to maintain the selected offset distance in an absence of the control signal.

In accordance with another aspect of the present invention 1 wherein the first acceleration and the second acceleration are indicative of an erratic longitudinal velocity of the target vehicle.

In accordance with another aspect of the present invention wherein the sensor is further operative to detect a fourth distance between the host vehicle and the target vehicle and wherein the processor is further operative to determine a third acceleration in response to the third distance and the fourth distance and wherein the calculated offset distance is calculated in response to the third acceleration.

In accordance with another aspect of the present invention wherein the vehicle controller is operative to perform an adaptive cruise control algorithm.

In accordance with another aspect of the present invention the first acceleration and the second acceleration are indicative of the target vehicle swerving within a road lane.

In accordance with another aspect of the present invention a method including receiving a selected offset distance from a user interface in response to a user selection, controlling a vehicle velocity such that the selected offset distance is maintained between a host vehicle and a target vehicle, detecting a first distance between the host vehicle and the target vehicle at a first time, detecting a second distance between the host vehicle and the target vehicle at a second time, detecting a third distance between the host vehicle and the target vehicle at a third time, calculating a first acceleration of the target vehicle in response to the first distance and the second distance, calculating a second acceleration of the target vehicle in response to the second distance and the third distance, comparing the first acceleration and the second acceleration to a threshold acceleration value and generating an increased offset distance in response to the first acceleration and the second acceleration exceeding the threshold acceleration value, and controlling the vehicle velocity such that the increased offset distance is maintained between the host vehicle and the target vehicle.

In accordance with another aspect of the present invention wherein the selected offset distance is a following distance between the host vehicle and the target vehicle for an adaptive cruise control algorithm.

In accordance with another aspect of the present invention wherein the selected offset distance is a lateral offset distance between the host vehicle and the target vehicle for a lane centering algorithm.

In accordance with another aspect of the present invention wherein the first acceleration and the second acceleration are indicative of an erratic longitudinal velocity of the target vehicle.

In accordance with another aspect of the present invention wherein the first acceleration and the second acceleration are indicative of the target vehicle swerving within a road lane.

In accordance with another aspect of the present invention an advanced driver assistance system for controlling a host vehicle including a sensor for detecting a first acceleration of a target vehicle at a first time and a second acceleration of the target vehicle at a second time, a processor operative to calculate an increased distance in response to the first acceleration and the second acceleration exceeding an acceleration threshold, the processor further operative to generate a control signal indicative of the increased distance, and a vehicle controller for controlling a vehicle throttle controller and a vehicle steering controller to maintain an initial distance between the host vehicle and the target vehicle and to maintain the increased distance between the host vehicle and the target vehicle in response to the control signal.

In accordance with another aspect of the present invention wherein the first acceleration and the second acceleration exceeding the acceleration threshold are indicative of an erratic velocity of the target vehicle.

In accordance with another aspect of the present invention wherein the initial distance and the increased distance are following distances for use in an adaptive cruise control system for controlling the host vehicle.

In accordance with another aspect of the present invention wherein the first acceleration and the second acceleration exceeding the acceleration threshold are indicative of the target vehicle swerving in a proximate road lane.

In accordance with another aspect of the present invention wherein the sensor is a lidar system.

In accordance with another aspect of the present invention wherein the sensor is a radar system.

In accordance with another aspect of the present invention wherein the first acceleration and the second acceleration are indicative of an erratic longitudinal velocity of the target vehicle.

The above advantage and other advantages and features of the present disclosure will be apparent from the following detailed description of the preferred embodiments when taken in connection with the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings.

The exemplifications set out herein illustrate preferred embodiments of the invention, and such exemplifications are not to be construed as limiting the scope of the invention in any manner.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
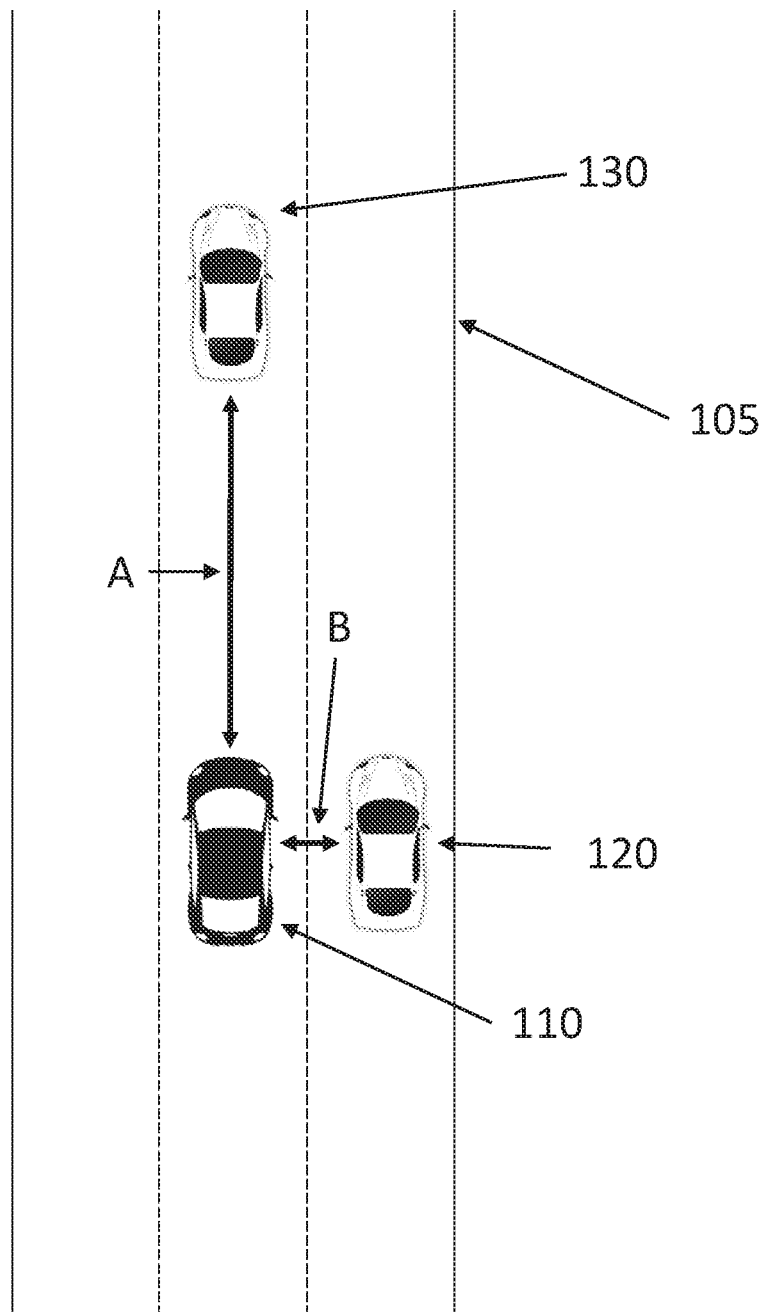
FIG. 1 shows an operating environment for dynamic adjustment of vehicle motion profiles for a motor vehicle according to an exemplary embodiment.

FIG. 1 schematically illustrates an operating environment for dynamic adjustment of vehicle motion profiles 100 for a motor vehicle 110. In this exemplary embodiment of the present disclosure, the host vehicle 110 is driving on a multilane roadway 105. The host vehicle 110 is travelling near a first proximate vehicle 120 and a second proximate vehicle 130. The following gap A is the distance between the host vehicle 110 and the second proximate vehicle 130 traveling in the same lane. The flowing gap A can be selected by an operator of an ADAS equipped vehicle for a distance comfortable to the operator. For example, the following gap A may be set to three seconds of the like. The lateral gap B is the distance between the host vehicle 110 and the first proximate vehicle 120 traveling in adjacent lanes. Generally, the lateral gap B is consistent if each vehicle is centered in their respective lanes. If the second proximate vehicle 130 moves closer to the host vehicle 110, the host vehicle 110 may deviate from the lane center to maintain the lateral gap B.

The presently disclosed system and method are operative to identify and categorize aggressive longitudinal vehicle behaviors and lateral vehicle behaviors and creates a longitudinal and lateral motion profiles based on the target categorization. The system and method are operative to create and categorize historical profiles for target object behaviors and subsequently utilize the categorical data to adjust braking and lateral offset profiles to deliver smooth vehicle dynamics providing more intuitive brake and steering response from ADAS features. The method is operative predict target vehicle motion based on constructed behavioral profiles and create dynamic brake, acceleration, and lateral offset profiles that provide increased safety and customer comfort.

In an exemplary embodiment, the host vehicle 110 is following the second proximate vehicle 130 in the same vehicle lane with a set speed and following gap A and keeping a minimum lateral gap with the first proximate vehicle 120. The second proximate vehicle 130 then exhibits a pattern of frequent breaking and accelerating, thereby frequently changing its vehicle speed. The first proximate vehicle 120 exhibits a pattern of frequent lateral movements due to inattentive or aggressive drivers, thereby swerving in its respective lane. The host vehicle 110 is then operative to keep track of the position of the first proximate vehicle 120 and the position of the second proximate vehicle 130 and categorizes them based on their longitudinal and/or lateral movements within a set window.

The host vehicle 110, with knowledge of the historical behavior of the first proximate vehicle 120 and the second proximate vehicle 130, anticipates aggressive braking and acceleration by the second proximate vehicle 130 and frequent lateral movements by of the first proximate vehicle 120. The host vehicle 110 is then operative to calculate an optimal speed, deceleration and lateral offset in response to the proximate vehicle behaviors and to temporarily adjust following gap and lateral offset to optimize the vehicle motion, more pleasant and safe driving experience.

Figure 2:
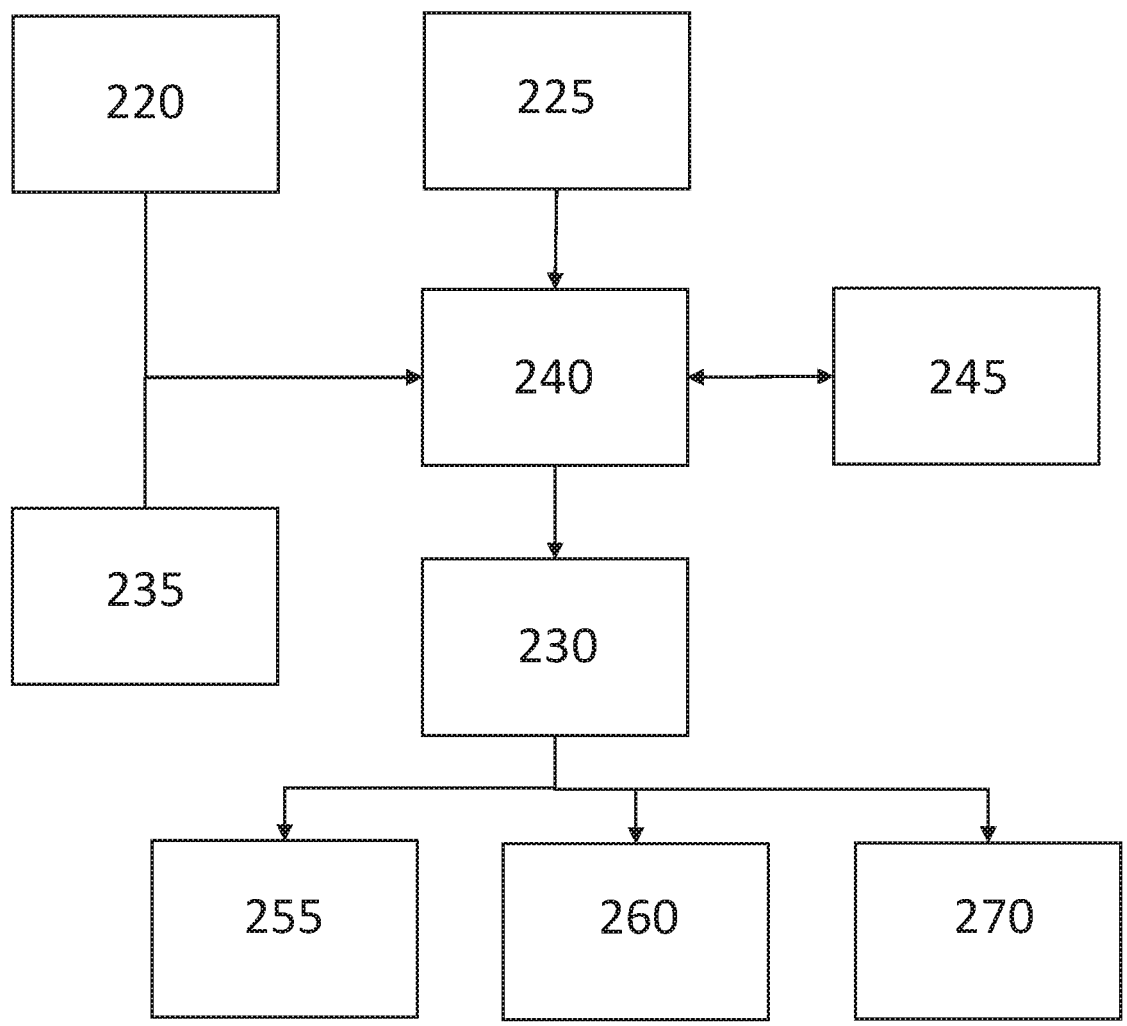
FIG. 2 shows a block diagram illustrating a system for dynamic adjustment of vehicle motion profiles for a motor vehicle according to an exemplary embodiment.

Turning now to FIG. 2, a block diagram illustrating an exemplary implementation of a system for dynamic adjustment of vehicle motion profiles for assisted driving 200 is shown. The system 200 includes a processor 240, a forward sensor 220, at least one lateral sensor 225, a user interface 235, a memory 245, a vehicle controller 230 a throttle controller 255, a brake controller 26 and a steering controller 270, a camera 240 and a GPS sensor 245.

The system is operative to use various sensors 220 225, such as cameras, radars, lidars, ultrasonic sensors, etc., capable of identifying and locating individual external objects. Sensor fusion algorithms provides accurate tracking of external objects as well as calculation of appropriate attributes such as relative velocities, accelerations, and the like. The forward sensor 220 is operative to measure a following gap between the host vehicle and a proximate vehicle in the same lane and immediately ahead of the host vehicle. The forward sensor 220 may be an ultrasonic or electromagnetic sensor, such as radar, or may be a light sensor, such as lidar. The forward sensor 220 is generally operative to transmit a signal, such as an ultrasonic signal, in the forward direction and to receive a reflection of the signal after it is reflected by an object in front of the host vehicle. The propagation time of the signal between transmission and reception is divided by two and multiplied by the speed of propagation, such as the speed of sound, to determine the following distance.

The lateral sensor 225 may be one of a plurality of lateral sensors located around the host vehicle, and is used to determine a lateral gap between the host vehicle and a proximate vehicle within the field of view of the lateral sensor 225. For example, the lateral sensor 225 field of view may be directed to the right side, or passenger side, of the host vehicle and may be used to determine the distance between the host vehicle and a vehicle in a lane to the right of the host vehicle. The lateral sensor 225 may be an ultrasonic, electromagnetic, or light sensor, such as lidar.

The user interface 235 may be a user input device, such as touch screen, dial, or button located in the vehicle cabin and accessible to the driver. Alternatively, the user interface 235 may be a program running on an electronic device, such as a mobile phone, and in communication with the vehicle, such as via a wireless network. The user interface 235 is operative to collect instructions from a vehicle operator such as desired following distance and activation of the system for dynamic adjustment of vehicle motion profiles for assisted driving. In response to a selection by the vehicle operator, the user interface 235 may be operative to couple a control signal or the like to the processor 240 for activation of the method for dynamic adjustment of vehicle motion profiles for assisted driving.

The processor 240 is operative to perform the method for dynamic adjustment of vehicle motion profiles for assisted driving in response to signals from the forward sensor 220, the lateral sensor 225 and the user interface 235. The processor 240 may be operative to control the forward sensor 225 and the lateral sensor 235 and to calculate the following gap and lateral gaps in response to signals from the forward sensor 225 and the lateral sensor 235. In an exemplary embodiment, the processor 240 may be an external object calculation module (EOCM) operative to perform dynamic algorithms to continuously calculate relative Time to Collision (TTC) and Lateral Offset estimates based on fused sensor data.

In an exemplary embodiment, target vehicle behavior is continuously analyzed and monitored by the processor 240. In response to the acceleration/deceleration of a target vehicle exceeds thresholds consecutively, the target vehicle s marked as having an aggressive longitudinal motion profile and the host vehicle gap with the target vehicle, velocity and acceleration is controlled to anticipate quick acceleration and braking by target vehicle. In addition, the processor 240 is operative to continuously monitor a target vehicle lateral motion and if the target vehicle encroaches into a host vehicle zone consecutively, then the target vehicle is marked as having an aggressive lateral motion profile and the host vehicle will set a constant lateral offset while the target vehicle is in range.

In response to the determined flowing gap and/or lateral gap, the processor 240 may generate a control signal to couple to the vehicle controller 230. The control signal may instruct the vehicle controller 230 to reduce the throttle via the throttle controller 255 or to apply the friction brakes via the brake controller 260. The control signal may further instruct the vehicle controller to control the steering controller 270 in order to alter the lane centering position of the host vehicle in response to the determined lateral gap. The disclosed methods and apparatus may be used with any number of different systems and is not specifically limited to the operating environment shown here. The architecture, construction, setup, and operation of the system and its individual components is generally known. Other systems not shown here could employ the disclosed methods as well.

In an additional embodiment, the vehicle controller 230 may adjust the speed of the vehicle by reducing the throttle via the throttle controller 255 or to apply the friction brakes via the brake controller 260 in response to a driver profile saved in the memory 245. The driver profile may be generated in response to a desired following gap, desired lateral gap, and desired level of vehicle speed compensation in response to actions of proximate vehicles.

Figure 3:
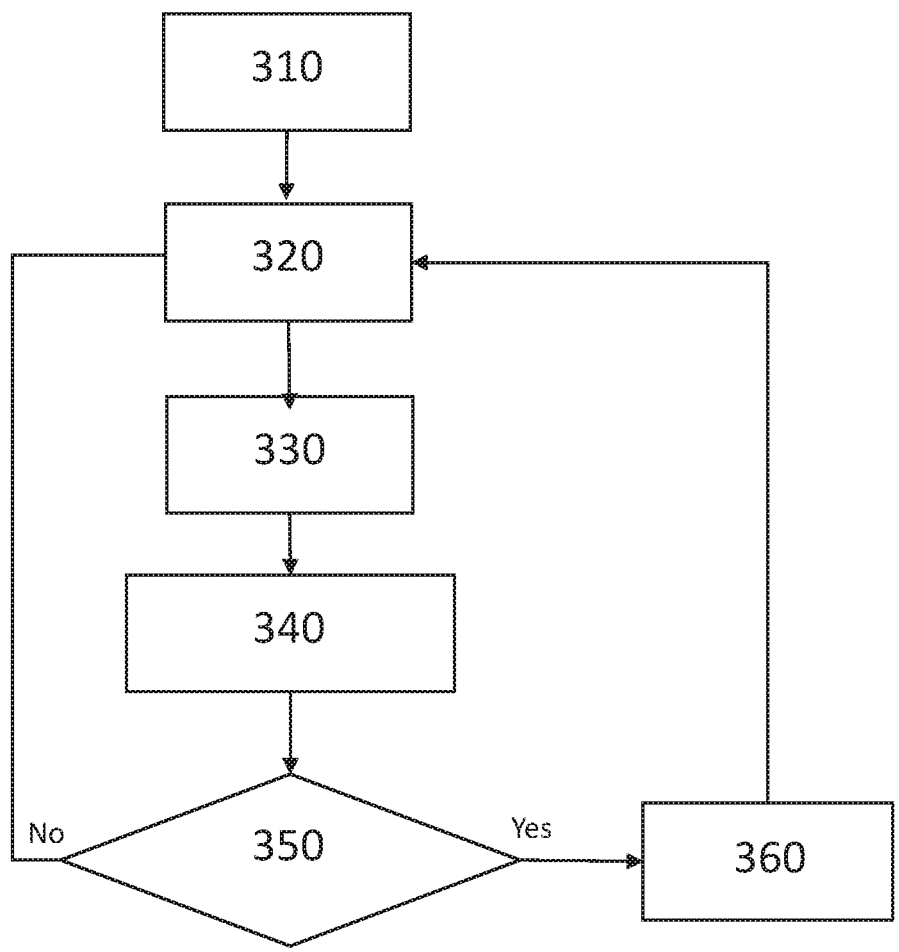
FIG. 3 shows a flow chart illustrating a method for dynamic adjustment of vehicle motion profiles for a motor vehicle according to another exemplary embodiment.

Turning now to FIG. 3, a flow chart illustrating an exemplary implementation of a method for dynamic adjustment of vehicle motion profiles for assisted driving 300 is shown. The method is first operative to receive 310 an input from the user interface indicative of the desired following gap and the activation of the ADAS with dynamic adjustment of vehicle motion profiles. For example, the following gap selections may be near, middle, and far with following gap times of 1.5 seconds, 2.5 seconds and 3.5 seconds respectively. The activation of the dynamic adjustment of vehicle motion profiles feature is operative to reduce the requirement of the host vehicle to continuously slow down and speed up to maintain the selected following gap while following a target vehicle with an erratic speed.

The method is next operative to determine 320 the distance to a target vehicle. In this exemplary embodiment, the method is operative to determine the longitudinal distance to a target vehicle in a vehicle lane ahead of the host vehicle. This measurement may be made according to one or more forward facing sensors operative to transit a signal and to receive a reflection of the signal off of the target vehicle. The method is then operative to adjust 330 the vehicle speed such that the longitudinal distance is equal to the desired following gap. The method may provide a vehicle controller with a new speed in response to which the vehicle controller may instruct a throttle controller to reduce the throttle or may instruct a brake controller to apply a friction brake. The method is then operative to continuously monitor 340 the longitudinal distance between the host vehicle and the target vehicle and to adjust the host vehicle speed to maintain the desired following gap.

The method is then operative to determine 350 if the longitudinal acceleration of the target vehicle has exceeded a threshold for a number of consecutive measurements by calculating a longitudinal acceleration of the target vehicle in response to periodic determinations of the longitudinal distance and then comparing this longitudinal acceleration of the target vehicle with a threshold. If the longitudinal acceleration of the target vehicle has not exceeded the threshold for a predetermined number of consecutive measurements, the method may store this longitudinal acceleration in a memory along with an indicator whether the current measurement has exceeded the longitudinal acceleration threshold. If the longitudinal acceleration of the target vehicle has exceeded the threshold acceleration for a predetermined number of consecutive measurements, the method is may then be operative to increase 360 the desired following distance of the host vehicle to the target vehicle.

Figure 4:
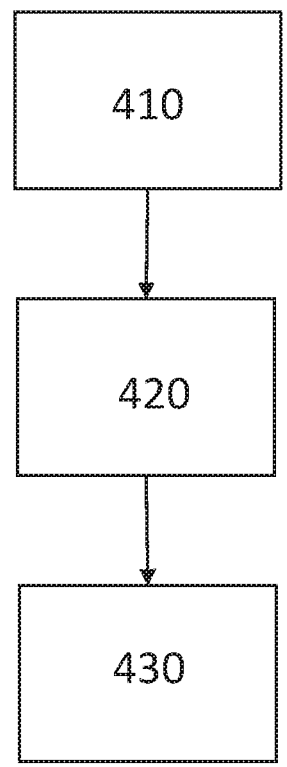
FIG. 4 shows a block diagram illustrating a system for dynamic adjustment of vehicle motion profiles for a motor vehicle according to another exemplary embodiment.

Turning now to FIG. 4, a block diagram illustrating another exemplary implementation of a system 400 for dynamic adjustment of vehicle motion profiles in a vehicle is shown. The system may be an advanced driver assistance system for controlling a host vehicle having a distance sensor 410, a processor 420 and a vehicle controller 430.

The sensor 410 is operative to detect a distance to an object within the sensor field of view. For example, the sensor 410 may be a vehicle lidar system wherein the sensor is operative to transmit a light pulse and receive a reflection of the light pulse from an object, such as a vehicle in a vehicle lane ahead of the host vehicle. Over a number of received reflections transmitted over a period of time, the sensor 410 is operative to detect an acceleration of the object at a number of points in time. The sensor 410 may be operative to store an acceleration value for the object periodically, such as every one second, and store these acceleration values in a memory for coupling to the processor 420. Thus, the sensor is operative to detect a first acceleration of a target vehicle at a first time and a second acceleration of the target vehicle at a second time.

The processor 420 is operative to calculate an increased distance in response to the first acceleration and the second acceleration exceeding an acceleration threshold. In an exemplary embodiment, the processor 420 is operative to receive the acceleration values from the sensor 410 and to compare these acceleration values against a set of threshold acceleration values to determine if the target vehicle has, over a time interval, positive and negative acceleration values that exceed the threshold. For example, if the target vehicle has a positive acceleration of 0.5 m/s$^2$ and a negative acceleration of −0.5 m/s$^2$ and wherein the threshold value is +/−0.4 m/s$^2$, the processor may be operative to determine that the target vehicle is accelerating erratically and that the host vehicle must increase the gap between the host vehicle and the target vehicle to deliver a smoother ride to the host vehicle. The accelerations may be lateral acceleration, indicative of the target vehicle swerving laterally within the lane, or may be longitudinal acceleration indicative of the target vehicle speeding up and slowing down within the vehicle lane. In response to the target vehicle accelerating, the processor 420 is further operative to determine an increased offset distance and/or host vehicle speed between the host vehicle and the target vehicle in order to achieve the smoother ride. For example, the processor 420 may determine that the offset distance should be increased from two seconds to three seconds. The processor 420 may further determine that a lane change is preferred and initiate a lane change algorithm in response to the target vehicle erratic acceleration. The processor 420 is then operative to generate a control signal indicative of the increased offset distance for coupling to the vehicle controller 430.

The vehicle controller 430 is operative to control a vehicle throttle controller, a vehicle steering controller, and/or a vehicle brake controller to maintain an initial distance between the host vehicle and the target vehicle and to maintain the increased distance between the host vehicle and the target vehicle in response to the control signal. In an exemplary embodiment, the initial distance and the increased distance are following distances for use in an adaptive cruise control system for controlling the host vehicle.

Figure 5:
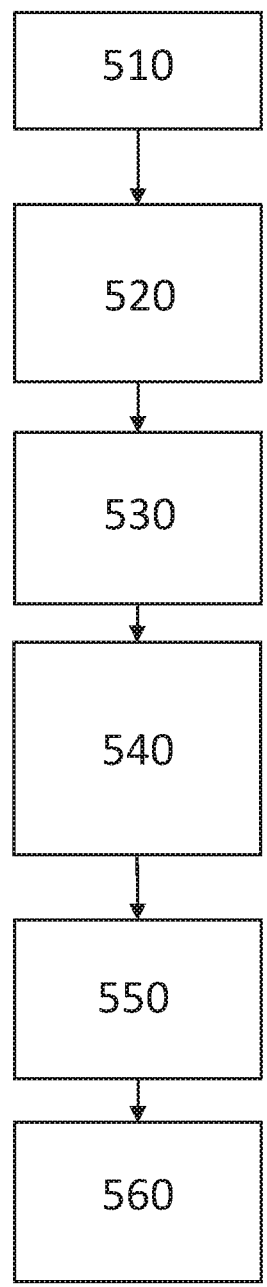
FIG. 5 shows a flow chart illustrating a method for dynamic adjustment of vehicle motion profiles for a motor vehicle according to another exemplary embodiment.

Turning now to FIG. 5, a flow chart illustrating an exemplary implementation of a system for vision based lateral acceleration prediction for assisted driving 500 in a host vehicle is shown. The method is first operative to receive 510 a selected offset distance from a user interface in response to a user selection. The user selection may be made via a user interface within a vehicle cabin or may be made through a wireless device, such as a mobile phone of key fob. The user select is indicative of a desired offset distance wherein the desired offset distance is a minimum maintained between the host vehicle and other proximate vehicles. For example, the desired offset distance may be a following distance used in an adaptive cruise control operation, may be a minimum lateral offset distance maintained between vehicles in adjacent lanes, or may be a combination of lateral and longitudinal distances.

The method is then operative to control 520 a vehicle velocity such that the selected offset distance is maintained between a host vehicle and a target vehicle. A vehicle controller may be operative to maintain the selected offset in response to an adaptive cruise control algorithm or the like and may be initiated in response to an initiation of an ADAS algorithm.

The method is then operative to periodically detect 530 the distance between the host vehicle and the target vehicle in order to maintain the selected offset distance. In addition, the method is operative to periodically determine an acceleration of the target vehicle and to store these periodically determined accelerations in a memory.

The method is then operative to compare 540 a consecutive plurality of the periodically determined accelerations of the target vehicle to a threshold acceleration value. If a predetermined number of the consecutive plurality of periodically determined accelerations exceed the threshold acceleration value, the method is operative to infer that the target vehicle is operating in an erratic manner and that the selected offset distance should be increased.

The method is then operative to calculate 550 an increased offset in response to the consecutive plurality of periodically determined accelerations. The increased offset may further include a wider hysteresis window such that the erratic acceleration of the target vehicle does not immediately affect the speed of the host vehicle thereby resulting in a smoother ride for occupants of the host vehicle.

The method is then operative to control 560 the host vehicle velocity such that the increased offset distance is maintained between the host vehicle and the target vehicle.

A vehicle controller may be operative to maintain the increased offset in response to an adaptive cruise control algorithm or the like. In an exemplary embodiment, the selected offset distance is a following distance between the host vehicle and the target vehicle for an adaptive cruise control algorithm and the first acceleration and the second acceleration are indicative of an erratic longitudinal velocity of the target vehicle. In an alternative embodiment, the selected offset distance is a lateral offset distance between the host vehicle and the target vehicle for a lane centering algorithm and the first acceleration and the second acceleration are indicative of the target vehicle swerving within a road lane.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An apparatus comprising:
   a sensor operative to detect a first distance between a host vehicle and a target vehicle at a first time, a second distance between the host vehicle and the target vehicle at a second time, and a third distance between the host vehicle and the target vehicle at a third time;
   a user interface operative to receive a user selection of a selected offset distance having an initial hysteresis window;
   a processor operative to determine a first acceleration of the target vehicle in response to the first distance and the second distance, and a second acceleration of the target vehicle in response to the second distance and the third distance, the processor further operative to calculate a calculated offset distance in response to the first acceleration and the second acceleration exceeding a threshold acceleration value and for generating a control signal in response to the calculated offset distance being greater than the selected offset distance; and
   a vehicle controller operative to maintain the calculated offset distance between the host vehicle and the target vehicle in response to the control signal, wherein the calculated offset distance further includes a wider hysteresis window than the initial hysteresis window.

2. The apparatus of claim 1 wherein the calculated offset distance is a following distance between the host vehicle and the target vehicle in a vehicle lane.

3. The apparatus of claim 1 wherein the selected offset distance is a lateral offset distance between the host vehicle in a first road lane and the target vehicle in an adjacent road lane.

4. The apparatus of claim 1 wherein the vehicle controller is operative to maintain the selected offset distance in an absence of the control signal.

5. The apparatus of claim 1 wherein the first acceleration and the second acceleration are indicative of an erratic longitudinal velocity of the target vehicle.

6. The apparatus of claim 1 wherein the sensor is further operative to detect a fourth distance between the host vehicle and the target vehicle and wherein the processor is further operative to determine a third acceleration in response to the third distance and the fourth distance and wherein the calculated offset distance is calculated in response to the third acceleration.

7. The apparatus of claim 1 wherein the vehicle controller is operative to perform an adaptive cruise control algorithm.

8. The apparatus of claim 1 wherein the first acceleration and the second acceleration are indicative of the target vehicle swerving within a road lane.

9. A method performed by a processor comprising:
   receiving a selected offset distance from a user interface in response to a user selection;
   controlling a vehicle velocity such that the selected offset distance having an initial hysteresis window is maintained between a host vehicle and a target vehicle;
   detecting a first distance between the host vehicle and the target vehicle at a first time;
   detecting a second distance between the host vehicle and the target vehicle at a second time;
   detecting a third distance between the host vehicle and the target vehicle at a third time;
   calculating a first acceleration of the target vehicle in response to the first distance and the second distance;
   calculating a second acceleration of the target vehicle in response to the second distance and the third distance;
   comparing the first acceleration and the second acceleration to a threshold acceleration value and generating an increased offset distance in response to the first acceleration and the second acceleration exceeding the threshold acceleration value; and
   controlling the vehicle velocity such that the increased offset distance is maintained between the host vehicle and the target vehicle, wherein the increased offset distance further includes a wider hysteresis window than the initial hysteresis window.

10. The method of claim 9 wherein the selected offset distance is a following distance between the host vehicle and the target vehicle for an adaptive cruise control algorithm.

11. The method of claim 9 wherein the selected offset distance is a lateral offset distance between the host vehicle and the target vehicle for a lane centering algorithm.

12. The method of claim 9 wherein the first acceleration and the second acceleration are indicative of an erratic longitudinal velocity of the target vehicle.

13. The method of claim 9 wherein the first acceleration and the second acceleration are indicative of the target vehicle swerving within a road lane.

14. An advanced driver assistance system for controlling a host vehicle comprising:
   a sensor for detecting a first acceleration of a target vehicle at a first time and a second acceleration of the target vehicle at a second time;
   a processor operative to calculate an increased distance in response to the first acceleration and the second acceleration exceeding an acceleration threshold, the processor further operative to generate a control signal indicative of the increased distance; and
   a vehicle controller for controlling a vehicle throttle controller and a vehicle steering controller to maintain an initial distance within an initial hysteresis window between the host vehicle and the target vehicle and to maintain the increased distance between the host vehicle and the target vehicle in response to the control signal, wherein maintaining the increased distance between the host vehicle and the target vehicle includes a wider hysteresis window than the initial hysteresis window.

15. The advanced driver assistance system for controlling the host vehicle of claim 14 wherein the first acceleration and the second acceleration exceeding the acceleration threshold are indicative of an erratic velocity of the target vehicle.

16. The advanced driver assistance system for controlling the host vehicle of claim 14 wherein the initial distance and the increased distance are following distances for use in an adaptive cruise control system for controlling the host vehicle.

17. The advanced driver assistance system for controlling the host vehicle of claim 14 wherein the first acceleration and the second acceleration exceeding the acceleration threshold are indicative of the target vehicle swerving in a proximate road lane.

18. The advanced driver assistance system for controlling the host vehicle of claim 14 wherein the sensor is a lidar system.

19. The advanced driver assistance system for controlling the host vehicle of claim 14 wherein the sensor is a radar system.

20. The advanced driver assistance system for controlling the host vehicle of claim 14 wherein the first acceleration and the second acceleration are indicative of an erratic longitudinal velocity of the target vehicle.

* * * * *